United States Patent [19]

Fernandez

[11] 4,215,462

[45] Aug. 5, 1980

[54] METHOD OF MAKING A TRANSLUCENT OPTICAL DIFFUSER FOR A LAMP

[76] Inventor: Emile C. Fernandez, 104 Lake Winnesmissitt Dr., Deland, Fla. 32720

[21] Appl. No.: 965,936

[22] Filed: Dec. 4, 1978

[51] Int. Cl.[3] .............................................. B23P 11/02

[52] U.S. Cl. ........................................ 29/448; 8/94.11; 29/460; 362/122

[58] Field of Search ......................... 29/428, 460, 448; 362/122; 8/94.11

[56] References Cited

U.S. PATENT DOCUMENTS

| | | | |
|---|---|---|---|
| 57,275 | 8/1866 | Aymard | 8/94.11 |
| 816,996 | 4/1906 | Plass | 362/122 |
| 1,452,229 | 4/1923 | Trenckmann et al. | 8/94.11 UX |
| 1,497,088 | 6/1924 | Carey | 8/94.11 UX |
| 1,532,015 | 3/1925 | Wright et al. | 8/94.11 |
| 2,196,238 | 4/1940 | Werby | 8/94.11 X |
| 2,516,286 | 7/1950 | Yeidel | 29/428 X |
| 2,845,699 | 8/1958 | Woodard | 29/448 X |
| 2,916,608 | 12/1959 | Brown | 362/122 |
| 3,302,276 | 2/1967 | Williams et al. | 29/460 X |
| 3,971,112 | 7/1976 | Amato et al. | 29/460 X |

FOREIGN PATENT DOCUMENTS

| | | | |
|---|---|---|---|
| 8262 | of 1897 | United Kingdom | 362/122 |

*Primary Examiner*—Charlie T. Moon
*Attorney, Agent, or Firm*—Duckworth, Hobby, Allen & Pettis

[57] ABSTRACT

A flower lamp includes first, second and third diffuser sections each being configured in the shape of a flower petal. Each diffuser section includes a wire frame, a section of translucent material and means for securing the material to the frame. The first, second and third diffuser sections are coupled to a shaft and extend in a generally vertical direction from the shaft. A base is coupled to the lower end of the shaft and supports the shaft in a vertical direction. In one embodiment of the invention, the translucent diffuser material is formed from pieces of chemically treated animal bladder. The method of chemically treating animal bladders to convert them into a translucent diffuser material suitable for use in a high temperature environment is also disclosed.

8 Claims, 4 Drawing Figures

METHOD OF MAKING A TRANSLUCENT OPTICAL DIFFUSER FOR A LAMP

BACKGROUND OF THE INVENTION

1. Field of the Invention

The present invention relates to ornamental lamps configured to resemble a flower, and more particularly to ornamental lamps having translucent diffusers formed from chemically treated animal bladders.

2. Description of the Prior Art

The prior art discloses several methods for treating animal bladders to render them durable and odor free. U.S. Pat. No. 57,275 (Aymard) discloses a process for treating animal bladders which includes the steps of soaking a bladder in a strong brine solution, immersing the bladder in a tanning solution for a lengthy period of time, and drying the treated bladder in an inflated state. The treated bladders are subsequently bruised and rubbed with a board, exposed to the fumes of burning sulfur and rubbed once again between a pair of boards.

U.S. Pat. No. 1,532,015 (Wright and Quackenbush) discloses a method for treating the lining of the throat and bladder of cattle to create a gas impervious membrane. The disclosed process involves washing the bladder in a detergent solution and drying the bladder while inflated. The bladders are treated with a tanning agent and then soaked in a non-corrosive, hygroscopic material such as ethylene glycol and glycerine. The resulting material is rendered pliable at low temperatures and has a generally black color. Swedish Pat. No. 38,002 discloses another process of tanning animal bladders.

SUMMARY OF THE INVENTION

The present invention contemplates an ornamental lamp having first, second and third diffuser sections each being configured in the shape of a flower petal and including a frame, a section of translucent material, and means for securing the material to the frame. One end of the first, second and third diffuser sections is coupled to the upper end of a shaft. The three diffuser sections extend in a generally vertical direction upward from the upper end of the shaft. A base is coupled to the lower end of the shaft to maintain the shaft with a vertical orientation.

The present invention also contemplates a method for transforming an untreated animal bladder into a translucent material suitable for use in the diffuser sections of an ornamental lamp. The method comprises the steps of rinsing the bladder in a disinfectant solution and then inflating the bladder into a tightly stretched spherical configuration. The bladder is dryed and stored in an inflated condition. When ready for use, the inflated, dry bladder is soaked in water. A section of the moistened bladder is fitted to a diffuser form and secured to the form. A liquid wax solution is applied to both sides of the bladder section while that section remains in a moist condition.

DESCRIPTION OF THE DRAWING

The invention is pointed out with particularity in the appended claims. However, other objects and advantages together with the operation of the invention, may be better understood by reference to the following detailed description taken in connection with the following illustrations wherein:

DESCRIPTION OF THE PREFERRED EMBODIMENT

In order to better illustrate the advantages of the invention and its contribution to the art, a preferred hardware embodiment of the invention will now be described in some detail.

Figure 1:
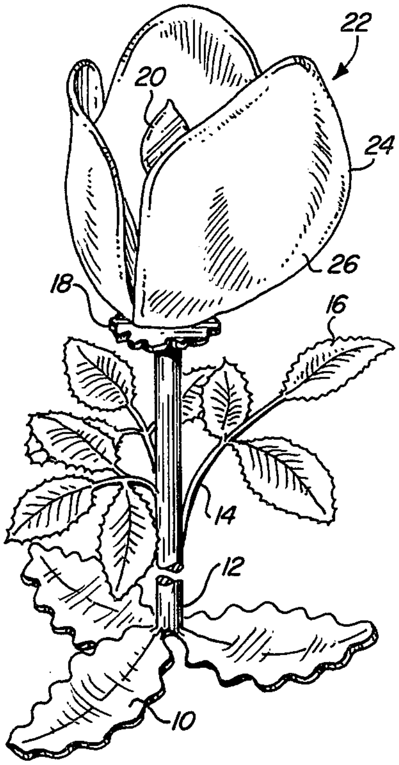
FIG. 1 is a perspective view of one embodiment of an ornamental lamp in accordance with the present invention.

Referring now to FIG. 1, one embodiment of a flower-shaped lamp built in accordance with the present invention includes a base 10 which includes a plurality of legs configured to generally resemble the petals of a flower. A shaft 12 includes a lower end which is coupled to base 10 and which extends vertically upward from base 10. A plurality of stems, such as stem 14, extend outward from the periphery of shaft 12 and include a plurality of leaf-like elements 16. A generally circular shield 18 is coupled to the upper end of shaft 12. An electrical socket (not shown) is secured to the upper end of shaft 14 and is designed to contain a light blub 20 or an equivalent electrically powered source of illumination. An electrical line cord is coupled from the light socket through shaft 12 and is connected to a source of electrical power.

An electrical on/off switch can be coupled either to the electrical light socket or in series with the line cord at various positions along the length of the line cord.

Figure 2:
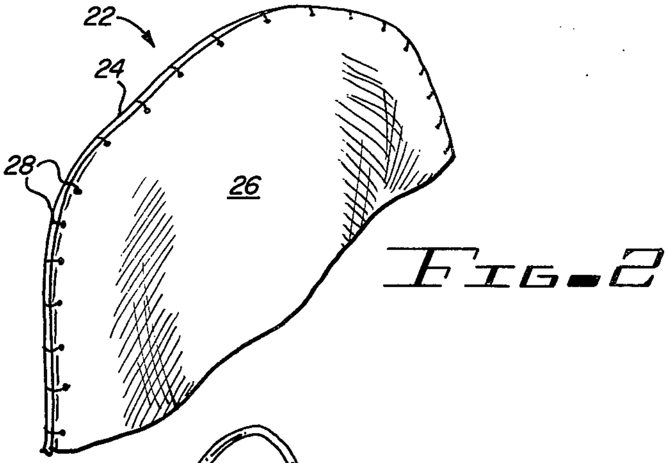
FIG. 2 is an enlarged perspective view of a diffuser section of the present invention, particularly illustrating the type of stitching which is used to secure the bladder section to the wire form.
Figure 3:
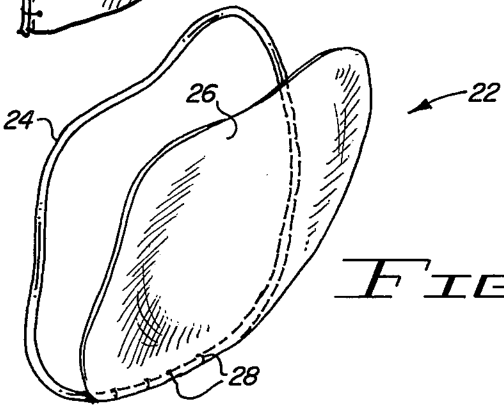
FIG. 3 is a perspective view illustrating the manner in which a moist bladder section is fitted to a bent wire frame.
Figure 4:
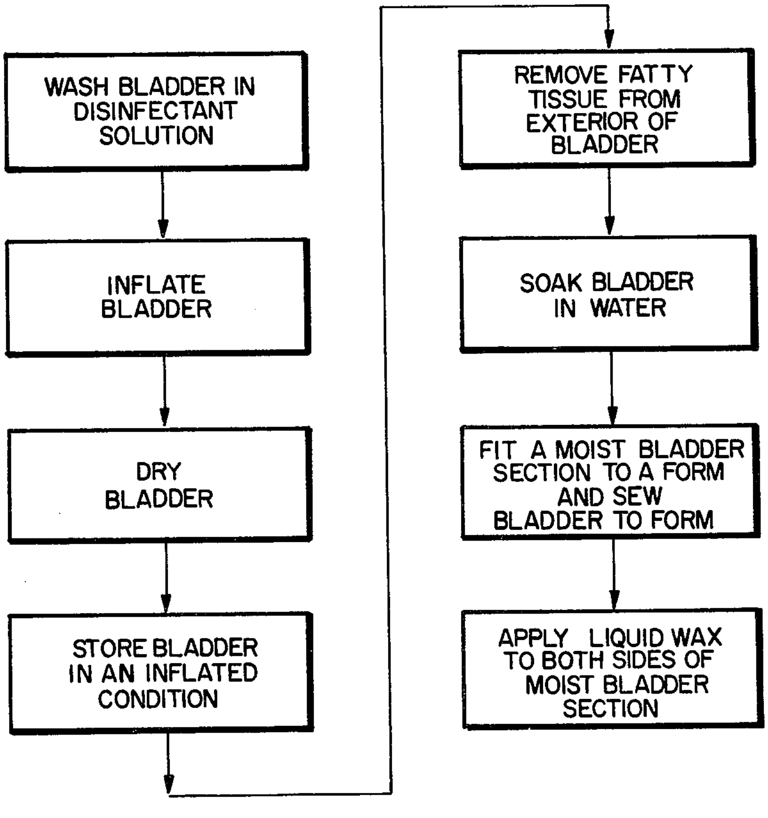
FIG. 4 is a block diagram illustrating the series of steps which are taken to transform a raw animal bladder into a translucent material for use in the ornamental lamp of the present invention.

Light source 20 is surrounded by a plurality of diffuser sections, such as diffuser section 22. Each diffuser section 22 is configured in the shape of a flower petal and includes a rigid metal exterior frame 24 and a section of chemically treated translucent animal bladder 26. The combination of the three diffuser sections serve as a lamp shade equivalent or as an optical diffuser to soften the harsh direct illumination coming from light source 20. FIGS. 2 and 3 indicate that a single continuous length of thread 28 secures each section of treated animal bladder to the exterior frame 24. Wire frame 24 is first bent into the desired petal-like configuration. A section of treated animal bladder is then cut to the desired shape and the matching section of bladder 26 and frame 24 are then coupled together by a length of thread 28 as shown.

Since all sections of the ornamental lamp of the present invention except the diffuser sections, light socket and light bulb are typically fabricated from metal having a rather plain appearance, it is frequently desirable to enhance the aesthetic appeal of the lamp by electroplating all metal surfaces with a coating such as bronze. The resulting gold-colored plated lamp is substantially more attractive than the unplated version.

In the preferred embodiment of the present invention, chemically treated animal bladders are typically incorporated into the translucent sections of the diffuser. The method of chemically treating an animal bladder to render it sufficiently durable and odor free and to render it relatively insensitive to high temperatures will now be described.

In the preferred embodiment of the present invention, pig bladders are utilized. A raw pig bladder is initially washed in water after it has been removed from a butchered animal. The raw bladder is packed in salt and placed in a sealed plastic bag to be transported from the slaughtering house to the location where the bladder will be treated to render it usable in an optical diffuser.

The treatment in accordance with the present invention is commenced by removing the bladder from the plastic packing bag and washing in a solution of water and potassium permanganate or an equivalent disinfectant. Approximately 0.25 liters of potassium permanganate is mixed with 5 liters of water. The bladder is thoroughly washed in this disinfectant solution for several minutes. The bladder is orally inflated and sealed so that it can be maintained in a sealed condition. The bladder is then dryed by either placing it in direct sunlight or by placing it in a heated drying room. Once the drying process is complete, the bladder is maintained in an inflated condition until it is ready for use in a diffuser section of an ornamental lamp.

Sometime after the bladder has been dryed, the exterior of the bladder is gently scraped to remove any fatty tissue which may remain on the bladder.

When the dryed bladder is needed for use in an ornamental lamp, it is soaked in water just prior to use to soften and moisten the bladder. The moistened bladder is then cut either with a knife or scissors into sections which match the shape of a wire form to which it is to be connected. The section of bladder is stretched over the wire form and is sewn by hand into the wire form. Any excess bladder material is trimmed so that it is exactly fitted to the wire form.

Immediately after the trimmed bladder section has been sewn to the wire form and while the bladder section is still moist from the earlier soaking in water, a coating of liquid wax such as Johnson's Floor Wax is uniformly applied to both sides of the bladder. If desired and prior to applying the liquid wax to the bladder section, a small amount of either brown or yellow shoe polish can be applied to both sides of the moist bladder section to change the coloration of the bladder section. The timing of the application of the liquid wax to the stretched bladder section is critical. The bladder must be neither excessively wet nor totally dry. A semi-wet or moist state must be obtained prior to the application of the liquid wax. The properly timed application of liquid wax to the moist bladder section renders the bladder extremely strong and durable. The treated bladder section will not crack or break even after obtaining high temperatures by being placed in proximity to a high temperature light bulb as is used in the ornamental lamp of the present invention.

It will be apparent to those skilled in the art that the disclosed ornamental lamp and method of processing animal bladders may be modified in numerous ways and may assume many embodiments other than the preferred forms specifically set out and described above. For example, many different flower-like base and stem configurations, as well as either more or fewer diffuser sections may be incorporated in the ornamental lamp of the present invention without departing from the intended coverage of the invention. Accordingly, it is intended by the appended claims to cover all such modifications of the invention which fall within the true spirit and scope of the invention.

I claim:

1. A method for transforming an untreated animal bladder into a translucent optical diffuser for a lamp comprising the steps of:

a. rinsing the bladder in a disinfectant solution;
b. inflating the bladder into a tightly stretched sperical configuration;
c. drying and then storing the bladder in an inflated condition;
d. moistening the bladder in water;
e. providing a form for the lamp diffuser;
f. fitting a section of the moist bladder to the form and securing the section to the form; and
g. applying liquid wax to both sides of the bladder section while said section remains moist.

2. The method of claim 1 further comprising the step of removing fat from the exterior of the inflated, dryed bladder.

3. The method of claim 1 wherein the fitting step is accomplished immediately after the moistening step.

4. The method of claim 3 wherein the applying step is accomplished immediately after the fitting step.

5. The method of claim 1 wherein the fitted section of moist bladder is sewn to the form.

6. The method of claim 1 wherein the bladder is stretched tight over a wire form before it is secured thereto.

7. The method of claim 1 wherein a coating of colored polish is applied to both sides of the bladder section prior to the application of the liquid wax.

8. The method of claim 1 wherein the bladder is orally inflated.

* * * * *